Feb. 14, 1967    L. A. LITSKY    3,303,557
METHOD OF MAKING ANTIFRICTION BEARINGS
Filed March 3, 1961
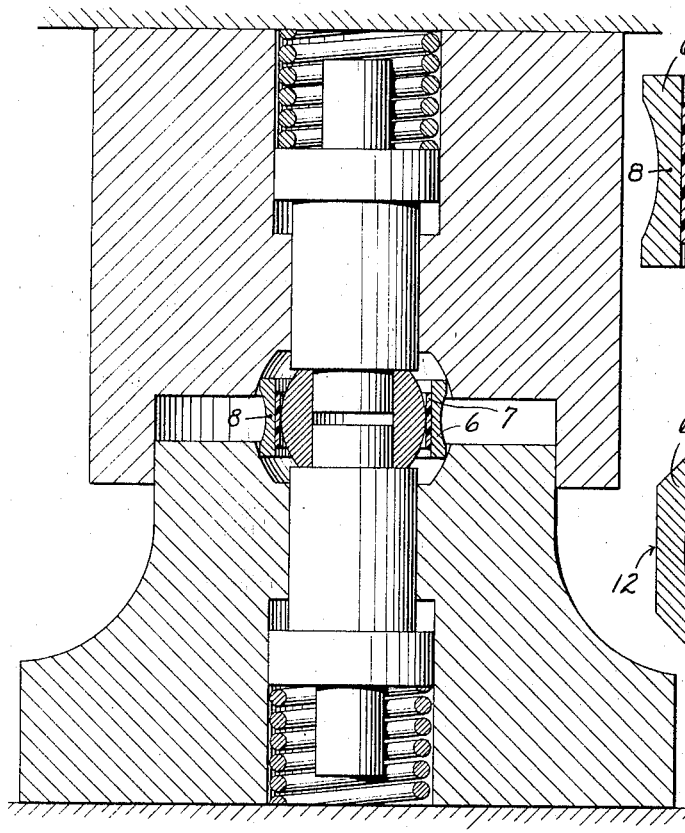
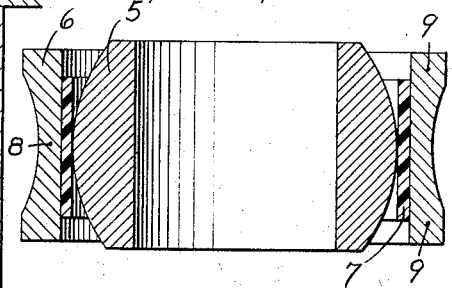
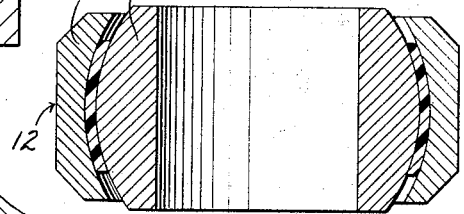
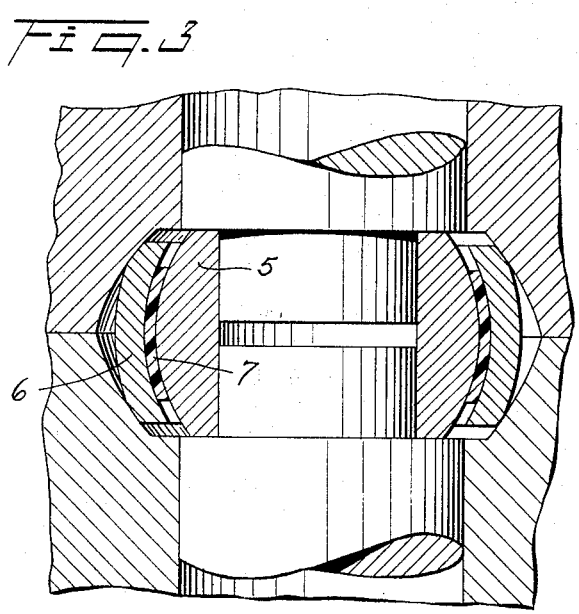
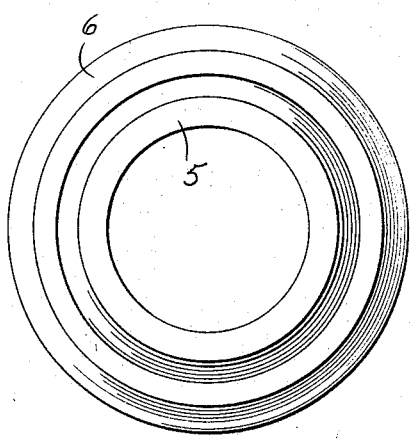
INVENTOR.
LEONARD A. LITSKY
BY
Roy C. Hopgood
ATTORNEY 3,303,557
METHOD OF MAKING ANTIFRICTION
BEARINGS
Leonard A. Litsky, New Britain, Conn., assignor to The Fafnir Bearing Company, New Britain, Conn., a corporation of Connecticut
Filed Mar. 3, 1961, Ser. No. 93,143
3 Claims. (Cl. 29—149.5)

The invention generally relates to antifriction bearings and, more particularly, to bearings of the ball and socket type.

The ball and socket or "spherical" bearings consist of inner and outer bearing rings having spherical race surfaces so as to be self-aligning, and the load is carried by the spherical surfaces of the inner and outer rings. Such self-aligning bearings are used to a large extent in the airplane industry particularly on various controls where heavy loads must be carried and yet where there must be sufficient freedom of motion to allow for some rotative movement as well as self-aligning movement between the rings.

It is the general object of the invention to provide an improved plain spherical bearing.

It is a more specific object to provide an improved method of making a "spherical" type bearing which has a one-piece outer ring and a one-piece inner ring held in spaced relation by a bearing lining.

Another object is to provide a novel and improved method of making a spherical bearing having inner and outer rings with generally spherical opposed races and a bearing lining between said spherical races together with a bearing liner between the rings.

Other objects and various features of novelty and invention will be hereinafter pointed out or will become apparent to those skilled in the art.

Briefly stated, the bearing, in its completed form, in accordance with the method of the invention, consists of a one piece ball-like or spherical inner bearing ring and a one piece outer bearing ring having an inner generally spherical surface surrounding the spherical inner ring and holding the same in place in the outer ring. A bearing liner is interposed between the two rings and serves to hold the rings out of contact with each other and to take the load between the rings. This bearing liner is preferably bonded to one ring and has sliding contact with the other ring during rotation, oscillation, or self-alignment of the bearing.

The bearing is preferably formed in accordance with the invention by holding a generally spherical or ball-like inner ring and then passing an outer ring over the inner ring. A bearing liner is interposed between the generally cylindrical inner surface of the outer ring and the outer spherical surface of the inner ring. The outer ring and bearing liner are then swaged over the ball so as to assume a generally spherical inner form corresponding in general to the spherical shape of the inner ring. The two rings are thus held against lateral displacement by reason of the swaging of the outer ring about the ball and the rings are spaced apart slightly by the bearing liner which is interposed between the two rings.

This bearing liner may be, and preferably is, formed of a material requiring no lubrication and yet is of a character to permit sufficiently free action between the generally spherical surface of one ring and the liner itself. A preferred form of liner material will be described in greater detail hereinafter.

In the drawings which show, for illustrative purposes only, a preferred form of the methods of making a:

FIG. 1 is a schematic view of a swaging press showing a bearing just before being swaged;

FIG. 2 is a diametral vertical sectional view, on an enlarged scale, of the bearing shown in FIG. 1, that is, when the parts are assembled with each other, but before swaging of the outer ring and the bearing liner;

FIG. 3 is an enlarged fragmentary view similar to FIG. 1 and showing the press dies in closed position and the outer ring and liner swaged into form;

FIG. 4 is a view of the swaged bearing, as shown in FIG. 3, after the outer periphery of the outer ring has been turned and ground to a cylindrical form; and FIG. 5 is an axial view in elevation of the bearing shown in FIG. 4.

In making the bearing, the inner ring 5 is formed of generally spherical shape, as shown in the drawings. An outer ring 6 is formed with a generally cylindrical inner surface or bore, and the inner diameter of the ring 6 and the outer diameter of the inner ring 5 are such as to provide clearance sufficient to receive a bearing liner 7 interposed between the two rings. The outer ring 6, in the initial form shown in FIGS. 1 and 2 has in cross section, the central portion 8 relatively thin while the two lateral edge sections 9—9 are relatively thicker or heavier.

The liner 7, in the preferred form, is bonded to one of the rings and runs freely on the other ring. In the particular form illustrated, the liner 7 is bonded to the outer ring 6. This liner 7 may be a continuous ring such as a short section cut from a tube and fits the cylindrical inner surface of the outer ring, or it may be a strip of liner material rolled up into ring form and bonded onto the inside of the outer ring.

After pre-assembling as shown in FIG. 2, the parts are put in a swaging press, as shown in FIG. 1, the outer circumferential edges of the outer ring 6 being contacted by opposed swaging tapered concavities which are concentric with the bearing pre-assembly. When the dies are closed, the outer ring is swagged into the form shown in FIG. 3, so that the inner cylindrical surface of the outer ring 6 becomes generally spherical and the bottom of the groove and the bearing liner also becomes spherical in form, so that both the outer ring and the bearing liner conform in shape to the spherical inner ring.

The swaged bearing then is removed from the press, and if desired, the outer surface of the outer ring, which has become somewhat convex, may be turned and ground, as indicated at 12 in FIG. 4, so as to form a generally cylindrical outer surface on the outer ring. It will be seen that during the swaging operation, the thicker edges of the outer ring are swaged down until they come quite close to the spherical surface of the inner ring and the liner itself serves as a spacer between the two rings. During the swaging operation, the liner is somewhat compressed and serves to hold the two rings quite firmly relatively to each other, and yet there may be self-aligning, oscillating, and rotating movement of the inner ring relative to the liner and outer ring.

The liner 7 may be formed of various materials, but in the present preferred form, consists essentially of Teflon fabric which may be backed up by fibre and plastic products so as to give more body to the Teflon fabric. Teflon provides for a relatively free self-alignment of the bearing and rotation between the inner and outer rings. No lubrication is required and there is no necessity for having oil holes or grooves or gutters in either ring.

Any of a number of ways may be used to bond the Teflon line 7 to the ring 6. Preferably, the liner 7 consists of Teflon yarns woven with cotton or some suitable resin-bondable yarn so that the Teflon yarns are exposed on one surface and the bondable yarns are exposed on the opposite surface. Of course, suitable adhesives may be used, if desired, or alternatively, the Teflon fabric may be bondable to the outer ring by the application of heat.

It should be stated that in the preferred form, the inner ring is hardened and its spherical surface is highly finished so that it moves quite freely in its bearing liner seat. The outer ring is heat treated for toughness but of lower hardness than the inner ring. The rings are always spaced apart by the liner and the bearing will take very heavy stresses radially and in any position of self-alignment within the limits of the bearing.

While the invention has been described in considerable detail and a preferred form illustrated, it is to be understood that various changes and modifications may be made within the scope of the invention, as defined in the appended claims.

I claim:

1. In a method of making a universal bearing of the ball and socket type in which an inner metal ball having an outer spherical surface is seated within a unitary outer metallic ring member, the improvement which comprises providing on the inner surface of a metallic ring member of cylindrical form a layer of fabric of bondable yarns and Teflon yarns woven together with said bondable yarns on one surface of said fabric and in contact with the inner surface of said ring and the Teflon yarns exposed on the other surface of said fabric, bonding the bondable yarns of said fabric to said inner surface of said ring member, whereby the fabric layer is maintained in position in said ring member, assembling a metal ball within said ring member and then applying external pressure on the outer surface of said ring member to convert the inner and outer surfaces of said ring member and said layer of fabric bonded thereto to a spherical form conforming substantially to the outer spherical surface of said ball, whereby the ball is locked in position within said ring member against axial displacement, with the exposed Teflon yarn in surface contact with said ball and forming a bearing surface therefor.

2. In a method of making a universal bearing of the ball and socket type in which an inner metal ball having an outer spherical surface is seated within a unitary outer metallic ring member, the improvement which comprises providing on the inner surface of a metallic ring member of cylindrical form one face of a bondable layer of fabric in contact with the inner surface of said ring, said fabric including Teflon yarns exposed on the other face of said fabric, bonding said fabric to said inner surface of said ring member, whereby the fabric layer is maintained in position in said ring member, assembling a metal ball within said ring member and then applying external pressure on the outer surface of said ring member to convert the inner and outer surfaces of said ring member and said layer of fabric bonded thereto to a spherical form conforming substantially to the outer spherical surface of said ball, whereby the ball is locked in position within said ring member against axial displacement, with the exposed Teflon yarn in surface contact with said ball and forming a bearing surface therefor.

3. In a method of making a universal bearing of the ball and socket type in which an inner metal ball having an outer spherical surface is seated within a unitary outer metallic ring member, the improvement which comprises bonding to the inner surface of a metallic ring member of cylindrical form a first surface of a bondable fabric liner, said liner including Teflon yarns exposed on its other surface, whereby the fabric layer is maintained in position in said ring member with the Teflon yarn facing radially inwardly, assembling a metal ball within said ring member, and then applying external pressure on the outer surface of said ring member to convert the inner and outer surfaces of said ring member and said layer of fabric bonded thereto to a spherical form conforming substantially to the outer spherical surface of said ball, whereby the ball is locked in position within said ring member against axial displacement, with the exposed Teflon yarn in surface contact with said ball and forming a bearing surface therefor.

No references cited.

JOHN F. CAMPBELL, *Primary Examiner.*

WHITMORE A. WILTZ, THOMAS H. EAGER,
*Examiners.*